J. W. PORCHER.
ATTACHMENT FOR LIME SPREADERS.
APPLICATION FILED MAR. 12, 1917.
1,247,001.
Patented Nov. 20, 1917.
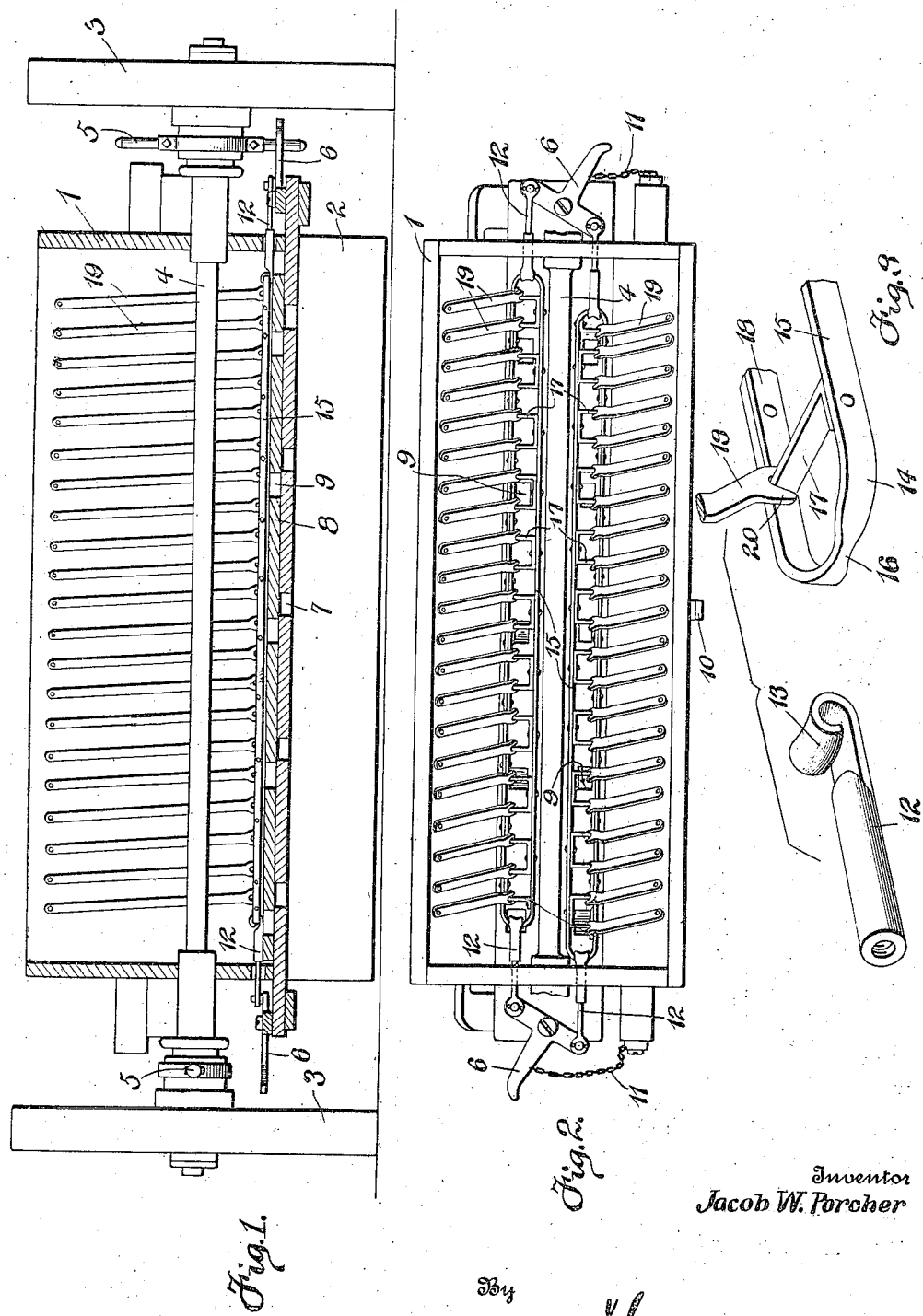
Inventor
Jacob W. Porcher

UNITED STATES PATENT OFFICE.

JACOB W. PORCHER, OF PORT WASHINGTON, OHIO.

ATTACHMENT FOR LIME-SPREADERS.

1,247,001.   Specification of Letters Patent.   Patented Nov. 20, 1917.

Application filed March 12, 1917. Serial No. 154,318.

*To all whom it may concern:*

Be it known that I, JACOB W. PORCHER, a citizen of the United States, residing at Port Washington, in the county of Tuscarawas and State of Ohio, have invented certain new and useful Improvements in Attachments for Lime-Spreaders, of which the following is a specification.

This invention relates to improvements in the lime spreader for which Letters-Patent No. 1,195,206 were granted to me April 15, 1913, the object of the present invention being to provide means whereby the lime will be prevented from sticking to the inner walls of the hopper and also to provide improved means for agitating the lime and scraping the same off the slide so that the lime will be prevented from clogging the openings in the slide. The improvements are illustrated in the accompanying drawings and will be hereinafter fully described and then particularly pointed out in the claims.

In the drawings:

Figure 1 is a vertical section taken longitudinally through the hopper;

Fig. 2 is a plan view;

Fig. 3 is a detail group perspective view of a portion of the scraper slide and the means for operating the same.

The hopper 1 is of the form shown in my aforesaid patent and is provided with an apron 2 on its front side, as described in said patent. The hopper is supported by ground wheels 3 which are loosely mounted upon the axle 4 and are adapted to actuate the same through the usual escapements, the portion of the axle between the ends of the hopper being angular in cross section so that by its rotation it will serve to agitate the lime and keep the same in condition for spreading. Secured upon the axle, adjacent the wheels 3, are tappet arms 5 which are adapted to impinge against the outstanding arms of T-shaped levers 6 whereby as the apparatus is drawn forward over the field the lime will be agitated and discharged through openings 7 in the bottom of the hopper as set forth in my aforesaid patent. A cut off or slide valve 8 is mounted upon the bottom of the hopper and provided with openings 9 adapted to register with the openings 7 to a greater or less extent and thereby regulate the quantity of lime discharged. This slide 8 may be adjusted by a hand lever 10 mounted on the back of the hopper and chains or other members 11 are provided and connected with the T-shaped levers 6 so as to properly set the discharging slides or scrapers when starting at the end of a row, it being understood that it is desired to discharge the lime directly upon or immediately around the young growing plants or at points where seed has been sowed.

The tappet arms 5, at one end of the machine, are disposed at a right angle to the arms at the opposite end of the machine so that the T-shaped levers 6 will be alternately engaged and operated. To the ends of the head members of these levers, I pivot links 12 which extend through the end walls of the hopper and are slidably mounted therein. The inner ends of these links are formed into eyes or hooks 13 which are adapted to engage around the end members 14 of the scrapers 15. The said scrapers consist of open frames having their end members 14 reduced centrally, as shown at 16, whereby they may be readily engaged with the hooks or lips 13 of the links 12 and the relative angular movement of the parts accommodated. At intervals along the scraper frames 15, I provide cross bars 17 which rest upon the upper surface of the slide 8 and, consequently, as the levers 6 are vibrated, will reciprocate over said slide and thereby scrape the lime to and into the openings 9, whence it will gravitate to the ground. The cross bars 17 may be connected at alternate sides by bars 18 formed integral therewith and rigidly secured to the inner faces of the sides of the frame 17, this construction being exceedingly strong and rigid so that any tendency of the frame to rise from the slide and permit an accumulation of lime at any point of the same will be positively overcome. Upon the front and rear walls of the hopper and at the upper edges thereof, I pivotally attach the vibratory scrapers 19 which consist of flat bars or arms arranged to lie squarely upon the base of the hopper and constructed at their lower ends with forks 20 adapted to project over the sides of the scraper frames 15 and engage the cross bars 17 of the same, as clearly shown in Fig. 3.

The operation will be readily understood. As the machine is drawn forward, the frames 15 are reciprocated over the slide 8, as before stated, and the lime thereby scraped to and into the openings 9. The movement of the scraper frames will be transmitted directly to the vibratory arms 19 and said arms will, consequently, be caused to ride or swing upon the inner surfaces of the front and rear walls of the hopper and scrape therefrom any lime which may tend to adhere thereto. The formation of the forks 20 is such that they will readily accommodate themselves to the relative movement of the members 15 and 19 and tilting of these parts will be effectually prevented.

My present improvements are exceedingly simple and may be applied to a lime scraper at a trifling cost.

Having thus described the invention, what is claimed as new is:

1. In a lime spreader, the combination with a hopper having discharge openings in its bottom, of a rigid scraper frame mounted to reciprocate upon said bottom, means for actuating said scraper frame, and a plurality of scraper arms pivoted at their upper ends to the walls of the hopper and having their lower ends loosely engaging the scraper frame.

2. In a lime spreader, the combination of a hopper having discharge openings in its bottom, a rigid scraper frame having its end portions reduced, links slidably mounted in the end walls of the hopper and provided at their inner ends with eyes adapted to loosely engage around the reduced end portions of the scraper frames, and means acting upon said links to reciprocate the scraper frame.

3. In a lime spreader, the combination with a hopper having discharge openings in its bottom, of a scraper mounted to reciprocate over said bottom and consisting of an open frame, transverse bars secured rigidly in said frame and means acting on the end of said frame to reciprocate the same.

4. In a lime spreader, the combination of a hopper having discharge openings in its bottom, a rigid scraper frame mounted to reciprocate upon the bottom of the hopper and having cross bars at intervals between its ends, means for reciprocating said scraper frames, and scraper arms pivoted at their upper ends upon the wall of the hopper and having their lower ends forked to loosely engage over the cross bars of the scraper frame.

In testimony whereof I affix my signature.

JACOB W. PORCHER. [L. S.]

Copies of this patent may be obtained for five cents each, by addressing the "Commissioner of Patents, Washington, D. C."